US012673264B2

(12) United States Patent
Li

(10) Patent No.: US 12,673,264 B2
(45) Date of Patent: Jul. 7, 2026

(54) METHOD FOR VIRTUAL OBJECT INTERACTION, ELECTRONIC DEVICE, STORAGE MEDIUM, AND COMPUTER PROGRAM PRODUCT

(71) Applicant: SHANGHAI LILITH TECHNOLOGY CORPORATION, Shanghai (CN)

(72) Inventor: Yining Li, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 203 days.

(21) Appl. No.: 18/795,793

(22) Filed: Aug. 6, 2024

(65) Prior Publication Data

US 2025/0144524 A1 May 8, 2025

Related U.S. Application Data

(63) Continuation of application No. PCT/CN2024/081912, filed on Mar. 15, 2024.

(30) Foreign Application Priority Data

Nov. 7, 2023 (CN) .......................... 202311477047.2

(51) Int. Cl.
*A63F 13/56* (2014.01)
*A63F 13/52* (2014.01)
*A63F 13/58* (2014.01)
(52) U.S. Cl.
CPC .............. *A63F 13/56* (2014.09); *A63F 13/52* (2014.09); *A63F 13/58* (2014.09); *A63F 2300/65* (2013.01); *A63F 2300/6623* (2013.01)

(58) Field of Classification Search
CPC .......... A63F 13/56; A63F 13/52; A63F 13/58; A63F 2300/65; A63F 2300/6623
(Continued)

(56) References Cited

U.S. PATENT DOCUMENTS 9,076,292 B1 * 7/2015 Berger .................... A63F 13/67
2005/0050286 A1 3/2005 Crowley et al.
(Continued)

FOREIGN PATENT DOCUMENTS

CN 103729435 A * 4/2014 ............. G06F 16/27
CN 116271833 A 6/2023
(Continued)

OTHER PUBLICATIONS

Machine translation of CN116983649A (Year: 2023).*
(Continued)

*Primary Examiner* — Allen Chan
(74) *Attorney, Agent, or Firm* — GREENBLUM & BERNSTEIN, P.L.C.

(57) ABSTRACT

A method for virtual object interaction. The method includes: receiving, by a server, an interaction instruction from a client to instruct multiple first virtual objects to interact with a target virtual object; creating, by the server, one or more mirror objects of the target virtual object, a sum of the number of the one or more mirror objects and the number of the target virtual object being the same as the number of the multiple first virtual objects; calculating, by the server, interaction data of interactions between the multiple first virtual objects, and the target virtual object and the one or more mirror objects; and synchronizing, by the server, first attribute data of the target virtual object and first attribute data of the one or more mirror objects based on the interaction data, and sending the synchronized first attribute data to the client.

15 Claims, 5 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2013/0072296 A1 * | 3/2013 | Miyazaki | ................ A63F 13/10 |
| | | | 463/31 |
| 2018/0341694 A1 | 11/2018 | Brown et al. | |
| 2023/0334721 A1 | 10/2023 | Mene et al. | |

FOREIGN PATENT DOCUMENTS

| | | | |
|---|---|---|---|
| CN | 116627261 A | 8/2023 | |
| CN | 116637369 A | 8/2023 | |
| CN | 116983649 A | 11/2023 | |
| CN | 117414582 A | 1/2024 | |

OTHER PUBLICATIONS

Machine translation of CN103729435A (Year: 2014).*
International Search Report and Written Opinion in related International Application No. PCT/CN2024/081912, dated Jul. 30, 2024, 9 pages.

* cited by examiner

Server 10

Client 20

Network

100

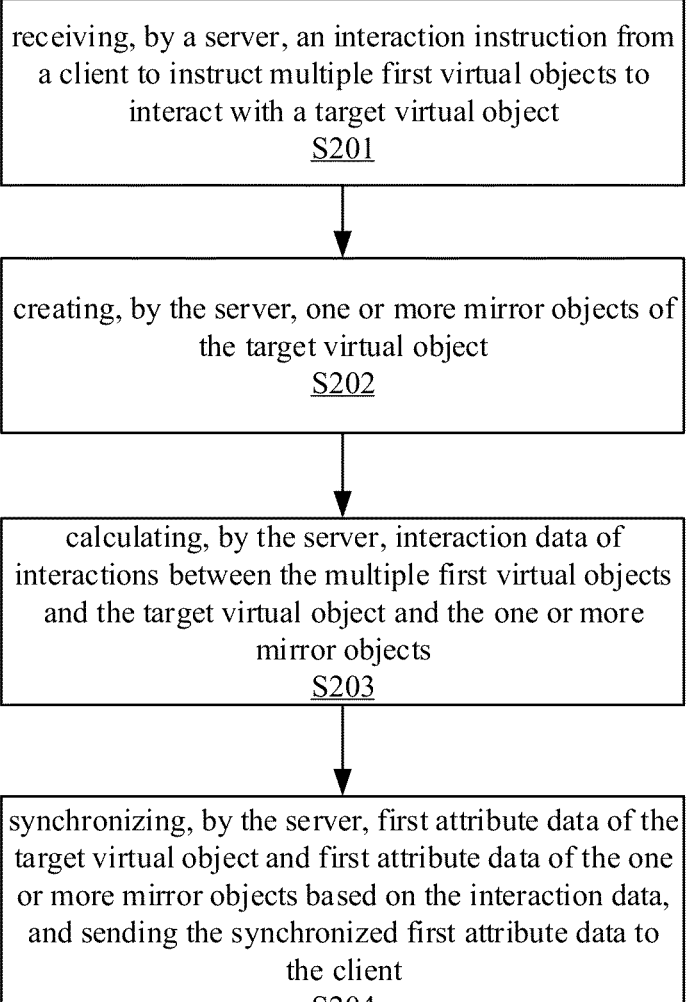

receiving, by a server, an interaction instruction from a client to instruct multiple first virtual objects to interact with a target virtual object
S201 creating, by the server, one or more mirror objects of the target virtual object
S202 calculating, by the server, interaction data of interactions between the multiple first virtual objects and the target virtual object and the one or more mirror objects
S203 synchronizing, by the server, first attribute data of the target virtual object and first attribute data of the one or more mirror objects based on the interaction data, and sending the synchronized first attribute data to the client
S204

FIG. 3

METHOD FOR VIRTUAL OBJECT INTERACTION, ELECTRONIC DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2024/081912, entitled "Method for Virtual Object Interaction, Device, Storage Medium, and Computer Program Product", filed on Mar. 15, 2024, which claims priority of Chinese patent application No. 2023114770472, filed on Nov. 7, 2023, the entire content of which are incorporated herein by reference.

TECHNICAL FIELD

The present application relates to the field of computer technology, and in particular to methods for virtual object interaction, electronic devices, storage medium and computer program products.

BACKGROUND

In a Simulation Game (SLG), a game player needs to plan and execute various strategies to achieve game goals. The gameplay of the SLG is diverse, and it may be turn-based or real-time mechanic, or it may be a single-player or multi-player game. Common types include strategic simulation, city construction, war strategies, etc.

In the SLG, the player usually needs to control multiple own virtual objects to participate in a "many-against-one" battle with an enemy virtual object, or in a "one-against-many" battle with multiple enemy virtual objects fighting against one of own virtual objects, thus achieving game strategies or game goals to present the strategy and realness of a scene simulation. However, in the existing turn-based SLG, the virtual objects controlled by the player take turns to fight against enemy units, and it is difficult for the multiple own units to participate in a battle interaction with the same enemy unit at the same time, thus making it impossible to achieve "many-against-one" or "one-against-many" real-time battle effects. In the real-time SLG, it is impossible to simulate a "many-against-one" or "one-against-many" real-time battle between group-type units vividly and truly either.

SUMMARY

The present application provides methods for virtual object interaction, devices, storage medium and computer program products.

In a first aspect, the present application provides a method for virtual object interaction, and the method includes following steps.

A server receives an interaction instruction from a client to instruct multiple first virtual objects to interact with a target virtual object.

The server creates one or more mirror objects of the target virtual object. A sum of the number of the one or more mirror objects and the number of the target virtual object is the same as the number of the multiple first virtual objects.

The server calculates interaction data of interactions between the multiple first virtual objects, and the target virtual object and the one or more mirror objects. Each of the multiple first virtual objects interact with the target virtual object and the one or more mirror objects in a one-to-one correspondence, and interaction processes are independent of each other.

The server synchronizes first attribute data of the target virtual object and first attribute data of the one or more mirror objects based on the interaction data, and sends the synchronized first attribute data to the client.

In some embodiments, the first attribute data include the number of hit points.

In some embodiments, the interaction data further include second attribute data that are only visible to the multiple first virtual objects, and to the target virtual object or the one or more mirror objects corresponding to each of the interaction processes. The second attribute data include a remaining skill cool down time, hit points restored during the interaction processes, a buff status and a debuff status.

In some embodiments, the second attribute data further include a debuff status caused by one of the multiple first virtual objects of a predetermined type, and the debuff status is configured to act on the target virtual object and all of the one or more mirror objects, respectively.

In some embodiments, the server calculates the interaction data of the interactions between the multiple first virtual objects, and the target virtual object and the one or more mirror objects includes following steps.

The server determines that, among the multiple first virtual objects, one first virtual object starting to participate in an interaction first is a main target object, and other first virtual objects are non-main target objects. Calculation rules of interaction data of the non-main target objects are different from calculation rules of interaction data of the main target object.

In some embodiments, the method further includes, under a condition that the main target object exits the interaction, the server determining that, among the non-main target objects, one non-main target object starting to participate in an interaction first is a new main target object.

In some embodiments, the multiple first virtual objects and the target virtual object each include one or more virtual object units of the same type.

In some embodiments, the interaction data include created, transmitted, used, or modified data involved in each of the interaction processes.

In some embodiments, an attribute of each of the one or more mirror objects is the same as an attribute of the target virtual object, or is a proportion of the attribute of the target virtual object.

In some embodiments, the method further includes showing the interactions between the multiple first virtual objects and the target virtual object on the client.

In some embodiments, during the interaction processes and in a current frame, the number of hit points of only one of the target virtual object and the one or more mirror objects is changed.

The server synchronizes the first attribute data of the target virtual object and the first attribute data of the one or more mirror objects based on the interaction data includes following steps.

The sever sums cumulatively change values of the number of the hit points of the only one of the target virtual object and the one or more mirror objects to obtain a cumulative change value of the number of the hit points.

The sever subtracts the cumulative change value of the number of the hit points from an original number of the hit points of the only one of the target virtual object and the one or more mirror objects in the current frame, to obtain an updated number of the hit points of the only one of the target virtual object and the one or more mirror objects.

The server changes each of hit point numbers of other of the target virtual object and the one or more mirror objects in a next frame to be the updated number of the hit points synchronously.

In some embodiments, during the interaction processes and in a current frame, hit point numbers of two or more of the target virtual object and the one or more mirror objects are changed.

The server synchronizes the first attribute data of the target virtual object and the first attribute data of the one or more mirror objects based on the interaction data includes following steps.

The server calculates a total change value of the hit point numbers of the two or more of the target virtual object and the one or more mirror objects in the current frame.

The server subtracts the total change value of the hit point numbers from an original number of hit points of any one of the target virtual object and the one or more mirror objects in the current frame, to obtain an updated number of each of hit point numbers of the target virtual object and the one or more mirror objects in a next frame.

In a second aspect, the present application provides an electronic device. The electronic device is the server and includes a memory having computer-executable instructions stored thereon and a processor. The computer-executable instructions, when executed by the processor, cause the server to perform the method for virtual object interaction of the first aspect.

In a third aspect, the present application provides a non-transitory computer storage medium, having instructions stored thereon. The instructions, when running on a computer, cause the computer to perform the method for virtual object interaction of the first aspect.

In a fourth aspect, the present application provides a computer program product, including computer-executable instructions. The computer-executable instructions, when executed by a processor, perform the method for virtual object interaction of the first aspect.

Compared with the related art, the main differences and effects of the embodiments of the present application are as follows.

In the present application, the server logically creates the mirror objects of the target virtual object on the client, so as to perform independent one-to-one interactions with the multiple first virtual objects, thereby realizing effects of simultaneous "many-against-one" or "one-against-many" battles in the SLG, and vividly and realistically presenting the real-time "many-against-one" or "one-against-many" battles between various objects including the virtual objects of the group type, thus making the game more strategic and realistic.

In the present application, the server configures the main target object and the non-main target objects, the real-time "many-against-one" or "one-against-many" battles between various objects, including virtual objects of the group type, is presented more vividly and truly on the client, thus achieving the effects that the main target object bear the brunt.

BRIEF DESCRIPTION OF THE DRAWINGS

FIG. 3 shows a flow chart of the method for virtual object interaction according to an embodiment of the present application.

DETAILED DESCRIPTION OF THE EMBODIMENTS

In order to make the purpose, technical solutions and advantages of the present application clearer, the embodiments of the present application will be further described in detail hereinafter with reference to the accompanying drawings.

Figure 1:
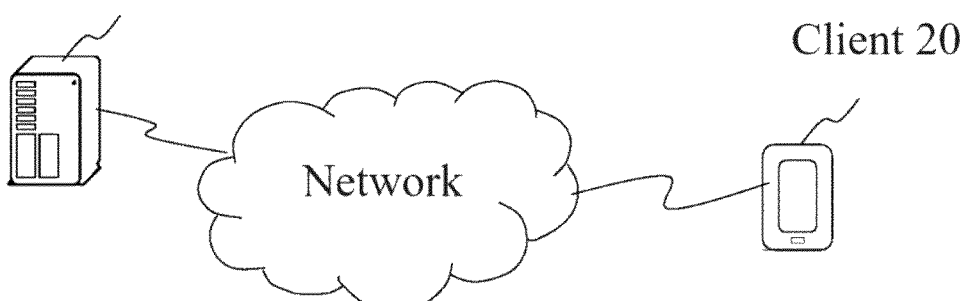
FIG. 1 is a view showing a structure of a system in which a method for virtual object interaction is implemented according to an embodiment of the present application.

FIG. 1 is a view showing a structure of a system in which a method for virtual object interaction is implemented according to an embodiment of the present application. The system in which the method for virtual object interaction of the present application is implemented may include a server 10 and a client 20. Data are transmitted between the server 10 and the client 20 via a communication network. The server 10 may receive real-time data sent by the client 20. The server 10 is an electronic device that includes a storage device storing computer-executable instructions and a processor. The client 20 may be a game client, specifically a mobile phone, a tablet, an e-reader, a laptop, or a desktop computer, etc.

Figure 2:
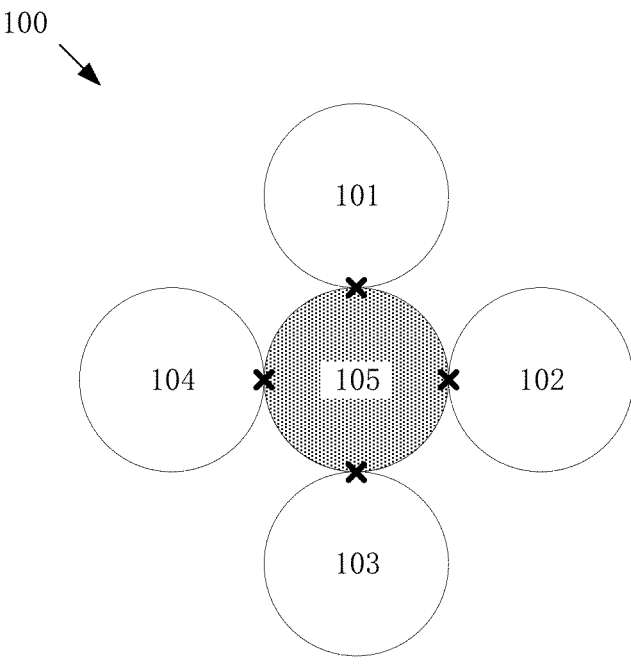
FIG. 2 shows a virtual scene of a client in which a method for virtual object interaction is implemented according to an embodiment of the present application.

FIG. 2 shows a virtual scene 100 of a client in which a method for virtual object interaction is implemented according to an embodiment of the present application. The virtual scene 100 includes a virtual object 101, a virtual object 102, a virtual object 103, a virtual object 104, and a virtual object 105 that may perform battle interactions. For example, the virtual scene 100 may be a virtual scene of a Simulation Game (SLG), and the virtual objects 101 to 105 may be individual soldiers, legions, troops, mobile fortresses, etc., which may perform battle interactions in the scene. The virtual objects 101 to 104 are virtual objects controlled by one or more players, and may be collectively referred to as first virtual objects and belong to the same camp. In other implementations, the virtual objects 101 to 104 may also belong to different camps, among which a virtual object of a camp A and a virtual object of a camp B may attack a virtual object of camp C at the same time. The virtual object 105 is an enemy virtual object or may also be referred to as a target virtual object, and belongs to another camp. During playing a game, when a player issues an attack instruction to the virtual objects 101 to 104, a target of the attack is the enemy virtual object 105, and the attack instruction is a type of interaction instruction. According to the attack instruction, in the existing turn-based SLG, for a reason of the limitations of the turn-based mechanic itself, the virtual objects 101 to 104 are usually instructed to take turns to interact with the target virtual object 105 in combat, and both sides launch the attacks in turns rather than at the same time. Accordingly, the interaction data are also calculated separately in turn, thus the "many-against-one" or "one-against-many" battle effect cannot be achieved at the same time. In the existing real-time SLG or Real-Time Strategy (RTS)

game, it is possible to command the virtual objects 101 to 104 to perform battle interactions with the target virtual object 105 in combat at the same time, and accordingly the interaction data are also real-time single target damage or area damage caused by attacks from both sides. In some specific scenes, the virtual objects participating in the interaction may be group-type virtual objects, such as legions or troops, inside each of which there may be one or more virtual object units of the same type, and the multiple virtual object units constitute one virtual object. In the real world, in scenes where groups such as legions and troops fight, when multiple groups A fight against one group B, the group B may be divided into multiple parts to fight against the multiple groups A respectively, but appears to be a whole in combat externally, such a battle effect cannot be achieved by the typical battle interaction mode above. Therefore, in order to present the real-time "many-against-one" or "one-against-many" battle between various objects more vividly and truly, it is necessary to propose a new battle interaction mode between virtual objects, and the corresponding calculation method of interaction data also needs to be improved. In view of this, the embodiments of the present application provide a method for virtual object interaction. FIG. 3 shows a flow chart of the method, and the method includes steps S201 to S204.

In step S201, the server 10 receives an interaction instruction from the client 20 to instruct multiple first virtual objects to interact with a target virtual object. For example, during playing a game, in a virtual scene 100, the player issues an attack instruction to his/her own virtual objects 101 to 104 (the first virtual objects), and the target of the attack is the enemy virtual object 105 (the target virtual object). The virtual objects 101 to 105 may be combatable legions, troops, mobile fortresses, etc. The virtual objects 101 to 104 may be controlled by the same player or different players. A single virtual object may include one or more virtual object units of the same type. For example, a tank troop may include ten tanks, but when battle interactions occur, various external attribute parameters of each virtual object are calculated based on a whole, that is, the external attribute parameters of one tank troop are calculated based on a tank cluster.

Figure 4:
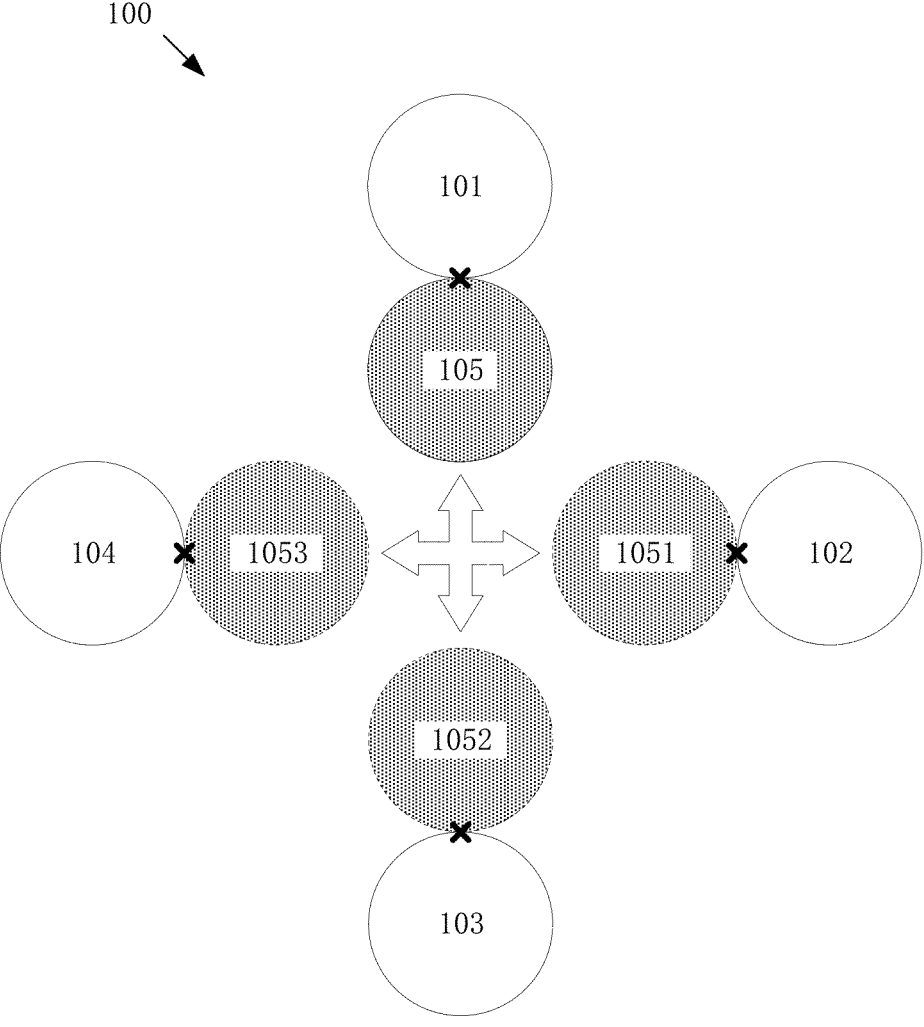
FIG. 4 shows a virtual scene in which the method for virtual object interaction is implemented according to an embodiment of the present application.

In step S202, the server 10 creates one or more mirror objects of the target virtual object. A sum of the number of the mirror objects and the number of the target virtual objects is the same as the number of the first virtual objects. For example, as shown in FIG. 4, the enemy virtual object 105 (the target virtual object) is besieged by four own virtual objects 101 to 104 (the first virtual objects), three mirror objects of the enemy virtual object 105, including a mirror object 1051, a mirror object 1052, a mirror object 1053, are created logically for subsequent calculations of the interaction data. The interaction data correspond to data involved in each interaction process, and include created, transmitted, used, and modified data. Since the own side has four virtual objects participating in the attack, three mirror objects of the enemy side are created, and then the enemy side has four virtual objects in total including the target virtual object, thus achieving a one-to-one correspondence. The attributes of the created mirror objects may be the same as the attribute of the target virtual object, or may be a certain proportion of the attribute of the target virtual object. For example, some attributes, such as the attack powers of the mirror object 1051, the mirror object 1052, and the mirror object 1053, each are a quarter of the attack power of the target virtual object 105. After the mirror objects are created, the attribute of the target virtual object may remain the same or change to a certain proportion of the original one. For example, after the mirror objects are generated, some attributes of the target virtual object 105, such as the attack power and the hit point, are a quarter of the original ones, respectively.

In step S203, the server 10 calculates interaction data of interactions between the multiple first virtual objects and the target virtual object and the mirror objects. The first virtual objects interact with the target virtual object and the mirror objects in a one-to-one correspondence, and the interaction processes are independent of each other. For example, after three mirror objects are created for the target virtual object 105, four groups of simultaneously performed interaction processes are formed, for example, between the virtual object 101 and the target virtual object 105, the virtual object 102 and the mirror object 1051, the virtual object 103 and the mirror object 1052, the virtual object 104 and the mirror object 1053, respectively. At the client 20, the four groups of interaction processes are independent of each other, and accordingly, the interaction data are also calculated independently by the server 10. For example, the interaction data are calculated independently as follows: if the virtual object 101 outputs 100 damage points to the target virtual object 105, then after the calculation of damage (for example, corresponding to the target virtual object 105 having 50 defense points), the hit points of the target virtual object 105 is reduced by 50 points; if the mirror object 1051 outputs 70 damage points to the virtual object 102, then after the calculation of damage (for example, corresponding to the virtual object 102 having 40 defense points), the hit points of the virtual object 102 is reduced by 30 points; and if the virtual object 103 releases skill on the mirror object 1052, then the mirror object 1052 obtains a corresponding debuff status DEBUFFa, and the attack power thereof is reduced by 20 points.

In step S204, the first attribute data of the target virtual object and the mirror object are synchronized by the server 10 based on the interaction data and are sent to the client 20. In this application, the first attribute data include hit point (health point) numbers of the target virtual object and the mirror object. During the interaction processes, in the same frame such as a current frame, under the condition that the number of the hit points of only one of the target virtual object and the one or more mirror objects is changed, for the only one of the target virtual object and the one or more mirror objects, whose number of the hit points is changed, change values of the number of hit points are cumulatively summed by the server to obtain a cumulative change value of the number of the hit points, and an updated number of the hit points of the only one of the target virtual object and the one or more mirror objects is obtained by subtracting the cumulative change value of the number of the hit points from an original number of the hit points of the only one of the target virtual object and the one or more mirror objects in the current frame. The server changes each of hit point numbers of other of the target virtual object and the one or more mirror objects in the next frame to be the updated number of the hit points synchronously.

For example, at a certain moment in the four groups of simultaneous interaction processes in step S203, the number of the hit points (the first attribute data) of the target virtual object 105, the mirror object 1051, the mirror object 1052, and the mirror object 1053 each are 1500 points.

After the calculation of the interaction data according to step S203, the number of the hit points of the target virtual object 105 is reduced by 50 points, namely the number of the hit points thereof is reduced from 1500 points to 1450 points, therefore the hit point numbers of the mirror object 1051, the mirror object 1052, and the mirror object 1053 are reduced synchronously from 1500 points to 1450 points in real time.

Alternatively, during the four groups of interaction processes above, in each frame, the server 10 collects the interaction data of each of the four groups of interaction processes from the client 20, and calculates cumulative reduced values of the hit points of the target virtual object 105, the mirror object 1051, the mirror object 1052, the mirror object 1053 respectively based on the interaction data, thereby obtaining cumulative change values of the hit point numbers respectively. For example, in an N-th frame, the hit point numbers of the target virtual object 105, the mirror object 1051, the mirror object 1052, and the mirror object 1053 each are 1500 points. In an (N+1)-th frame, the server 10 collects the interaction data of the four groups of interactive processes from the client 20 and calculates a cumulative change value of the number of the hit points of the target virtual object 105 to be 50 points, and the cumulative change values of the hit point numbers of other mirror objects each are zero point. Then the updated number of the hit points is obtained by subtracting the cumulative change value of the number of the hit points from the number of the hit points of the target virtual object or each of the mirror objects in the previous frame. For example, in the N-th frame, the number of the hit points of the target virtual object 105 is 1500 points, and subtracts the cumulative change value of the number of the hit points in the (N+1)-th frame of 50 points, then the updated number of the hit points is 1450 points. Although the hit point numbers of other mirror objects calculated according to the cumulative change values of the hit point numbers respectively are not changed, since the number of the hit points of the target virtual object 105 has changed, the hit point numbers of the mirror object 1051, the mirror object 1052, and the mirror object 1053 should be also synchronized from 1500 points in the N-th frame to 1450 points. Then the server 10 sends these updated hit points numbers to the client 20, and to the target virtual object and each mirror object on the client 20 synchronously. In this way, during this process, the change of the number of the hit points of the target virtual object may be displayed on the client 20 of the own player and the client 20 of the enemy player synchronously.

Similarly, during a subsequent interaction process, the virtual object 104 outputs damage to the mirror object 1053, and the number of the hit points of the mirror object 1053 is reduced from 1450 points to 1300 points according to the calculation of interaction data, then the hit point numbers of the virtual object 105, the mirror object 1051, and the mirror object 1052 are all synchronized from 1450 points to 1300 points in real time.

According to some embodiments of the present application, during the interaction processes, when the hit point numbers of two or more of the target virtual object and the mirror objects change in the same frame such as the current frame, the total change value of the hit point numbers of two or more of the target virtual object and the mirror objects is calculated by the server 10. Based on the calculated total change value of the hit point numbers, an updated number of the hit points of each of the target virtual object and the one or more mirror objects in the next frame is calculated by subtracting the total change value of the hit point numbers from an original number of the hit points of any one of the target virtual object and the one or more mirror objects in the current frame. For example, during a subsequent interaction, in an M-th frame and at the client side, the virtual object 101 outputs damage to the target virtual object 105, and the virtual object 103 also outputs damage to the mirror object 1052, and the mirror object 1051 and the mirror object 1053 are not damaged. The server 10 collects the interaction data of each of the four groups of interaction processes from the client 20, and based on these interaction data, the reduced hit point numbers of the target virtual object 105, the mirror object 1051, the mirror object 1052, and the mirror object 1053 are cumulatively summed to obtain the corresponding cumulative total change value of the hit point numbers as follows: the number of the hit points of the virtual object 105 is reduced from 1300 points to 1100 points, that is, the cumulative change number of the hit points is 200 points; the number of the hit points of the mirror object 1052 is reduced from 1300 points to 1200 points, that is, the cumulative change number of the hit points is 100 points. The total change value of the hit point numbers of the target virtual object and the mirror objects in the M-th frame is calculated as: 200+100=300 points. Then the server 10 synchronizes the hit point numbers of the target virtual object 105, the mirror object 1051, the mirror object 1052, and the mirror object 1053 in real time from 1300 points to: 1300–300=1000 points. That is, the number of the hit points in the (M+1)-th frame is 1000 points. Then the server 10 sends these updated hit points numbers to the client 20, and to the target virtual object and each mirror object on the client 20 synchronously.

In some embodiments of the present application, the method further includes showing the interactions between the multiple first virtual objects and the target virtual object on the client 20. It should be noted that the creation of the mirror objects above and the corresponding interaction processes are at a logical level, and images or models of the created new virtual objects will not be presented in any game graphics. The graphics presented to the player includes only the four virtual objects 101 to 104 simultaneously fighting against the target virtual object 105, just as shown in FIG. 2.

In the present application, the server 10 logically creates the mirror objects of the target virtual object on the client 20, so as to perform independent one-to-one interactions with the multiple first virtual objects, thereby realizing effects of simultaneous "many-against-one" or "one-against-many" battles in the SLG, and vividly and realistically presenting the real-time "many-against-one" or "one-against-many" battles between various objects including the virtual objects of the group type, thus making the game more strategic and realistic.

According to some embodiments of the present application, the interaction data also include the second attribute data that are only visible to the first virtual objects, the target virtual object or the mirror objects corresponding to each interaction process. The second attribute data include a remaining skill cool down time, hit points restored during the interaction processes, a buff status and a debuff status. For example, the attribute data other than the hit point numbers are the second attribute data. During the interaction processes, the second attribute data of the target virtual object 105, the mirror object 1051, the mirror object 1052, and the mirror object 1053 are not synchronized. The second attribute data are only visible in the interaction processes. According to the calculation of the interaction data performed in step S203, as the virtual object 103 releases skills on the mirror object 1052, the debuff status DEBUFFa obtained by the mirror object 1052 (whose attack power points are reduced by 20 points) will not be given to the target virtual object 105, the mirror object 1051, and the mirror object 1053 synchronously.

Taking the skill cool down time as an example, when the target virtual object 105 and the virtual object 101 are in a battle interaction, at a certain moment, the remaining cool down time of skill a of the target virtual object 105 is 30 seconds, and the target virtual object 105 has the remaining hit points of 500 points; at this time, the player commands the virtual object 102 to join the battle and fight against the target virtual object 105. According to the embodiments of the method of this application, the mirror object 1051 of the virtual object 105 is created to perform a battle interaction with the virtual object 102. At the beginning of the battle interaction between the mirror object 1051 and the virtual object 102, the remaining cool down time of skill a of the mirror object 1051 is zero second, that is, the default of the skill at the beginning of the interaction process is already in a ready status for releasing directly, instead of 30 seconds of the target virtual object 105, and the skill a may be released directly.

In this application, the hit point (health point) can be called "real blood", and the target virtual object and all mirror objects thereof keep the synchronized hit point attribute. If the "real blood" of the target virtual object drops to zero, it means that the target virtual object dies, and all of the mirror objects thereof also die synchronously, and the battle ends. On the other hand, if the "real blood" of a mirror object drops to zero, it means that the mirror object dies, the corresponding target virtual object and other mirror objects thereof also die synchronously, and the battle ends. Under a frame-synchronization mechanic, the "real blood" of the target virtual object and the mirror objects thereof will drop to zero in the same frame. During the battle interaction processes, the hit points (health points) of the target virtual object or the mirror object of the target virtual object, which are restored by mechanisms such as skills and props, etc., may be called "virtual blood". Such an increase in the health points is applied only in the interaction process of the target virtual object or the mirror object, rather than in other related interaction processes that are performed simultaneously. That is, the attribute of "virtual blood" are not be shared between or applied to the mirror objects synchronously. For example, in FIG. 4, during the battle between the virtual object 102 and the mirror object 1051, the mirror object 1051 releases the skill and the hit points thereof are restored by 100 points, but the hit points of the virtual object 105, the mirror object 1052, and the mirror object 1053 are not restored by 100 points synchronously. Under the current game configuration mechanic, during an interaction, the increase of "virtual blood" of a virtual object in the same round or in the same frame will not be higher than the hit point loss caused by an attack on the virtual object in this round or frame, therefore, after a calculation, the net change number of the hit points obtained within this round/frame in this interaction process is still negative, never causing a confusion of the first attribute data synchronization.

According to some embodiments of the present application, the second attribute data also include a debuff status caused by a first virtual object of a predetermined type, and the debuff status acts on the target virtual object and all mirror objects thereof. Specifically, the virtual objects controlled by the player are various, and special combat rules are preset for the virtual object of the predetermined type such as a mobile fortress, thus bringing about combat effects on enemy virtual objects that are not in any direct battle against the virtual object of the predetermined type. For example, in the four groups of interactive processes shown in FIG. 4, the virtual object 103 is not of the predetermined type, and the virtual object 103 imposes the debuff status DEBUFFa on the mirror object 1052, thus bringing about the combat effect that the attack power points of the mirror object 1052 are reduced by 20 points, but the attack power point numbers of the target virtual object 105, the mirror object 1051, the mirror object 1053 are not changed accordingly. If the virtual object 104 is a mobile fortress and is of the predetermined type above, when the virtual object 104 releases skills to the mirror object 1053, and accordingly imposes the debuff status DEBUFFb, and brings about a combat effect that the attack power points of the mirror object 1053 is reduced by 15 points, then the attack power points of the target virtual object 105, the mirror object 1051 and the mirror object 1052 are all reduced by 15 points, that is, a group BUFF effect is achieved. In addition, the BUFF effect exerted by the virtual object of the predetermined type may also be a gain effect for own or friendly objects, which includes an increase in attack power, or an increase in defense power, etc. For example, the virtual object 104 releases the skill, and accordingly applies the gain status BUFFc to all own virtual object 101, virtual object 102 and virtual object 103, whose defense powers each are accordingly increased by 25 points.

According to some embodiments of the present application, the method further includes determining that, among the multiple first virtual objects, one first virtual object starting to participate in an interaction first is a main target object, and the other first virtual objects are non-main target objects. Calculation rules of the interaction data of the non-main target objects are different from those of the main target object.

For example, referring to FIG. 4, the damages received by all non-main target objects, i.e., the virtual object 101, the virtual object 102, the virtual object 103, and the virtual object 104 each are reduced by a predetermined proportion (which may be understood that, the mirror objects which the non-main target objects fight against are weaker). In other words, if the same damage is input to the main target object and the non-main target objects, then after the calculation of damages, the actual damages received by the non-main target objects each are lower than the actual damage received by the main target object by a predetermined ratio, and the predetermined ratio may be 20% or any other suitable ratio. Alternatively, the damages received by all non-main target objects each may be preset to be increased by a predetermined proportion. In other words, if the same damage is input to the main target object and the non-main target object, then after the calculation of damages, the actual damages received by the non-main target objects each will be higher than the actual damage received by the main target object by a predetermined ratio. The predetermined ratio may be 20% or any other suitable ratio. Similarly, the damage received by the main target object may be preset to be increased by a predetermined ratio. In other words, if the same damage is input to the main target object and the non-main target objects, then after the calculation of damage, the actual damage received by the main target object will be higher than each of the actual damages received by the non-main target objects by a predetermined ratio, which can be 20% or any other suitable ratio.

In an exemplary embodiment, when the player controls the virtual object 101, the virtual object 102, the virtual object 103, and the virtual object 104 to attack the target virtual object 105 in sequence, four groups of mirror battles are triggered and include: the virtual object 101 fighting against the target virtual object 105, the virtual object 102 fighting against the mirror object 1051, the virtual object 103 fighting against the mirror object 1052, and the virtual object 104 fighting against the mirror object 1053 in sequence. Thus virtual object 101 is the first main target object, and the damage caused by the target virtual object 105 to the virtual object 101 will not be reduced by 20%, but the other three groups of mirror battles will be affected, that is, the damage caused by the mirror object 1051 to the virtual object 102, the damage caused by the mirror object 1052 to the virtual object 103, and the damage caused by the mirror object 1053 to the virtual object 104 each will be reduced by 20%.

According to some embodiments of the present application, the method further includes, under the condition that the main target object exits the interaction process, determining that, among the non-main target objects, one non-main target object that starts to participate in the interaction first as a new main target object.

For example, during an interaction process, if the player issues an instruction to command the virtual object 101 to withdraw from the battle, or if the virtual object 101 dies, then the interaction process between the virtual object 101 and the target virtual object 105 ends. Among the remaining three groups of interaction processes, the interaction process between the virtual object 102 and the mirror object 1051 starts earlier than the other two groups of interaction processes do, so the virtual object 102 becomes the new main target object, and the damage caused by the mirror object 1051 to the virtual object 102 will not be reduced by 20%, but the remaining two groups of battles will be affected, that is, the damage caused by the mirror object 1052 to the virtual object 103, and the damage caused by the mirror object 1053 to the virtual object 104 will be reduced by 20%.

In the real world, in scenes in which groups such as legions and troops fight, when multiple groups A fight against one group B, the firepower attracted by each of the multiple groups A will be different and depends on the order in which each of the multiple groups A joins the battle. For example, the vanguard unit that joins the battle first will attract the most firepower from the enemy units, i.e., will bear the brunt. By contrast, other units that join the battle later will attract less firepower from the enemy units. In the present application, the server configures the main target object and the non-main target objects, the real-time "many-against-one" or "one-against-many" battles between various objects, including virtual objects of the group type, is presented more vividly and truly on the client, thus achieving the effects that the main target object bear the brunt.

Figure 5:
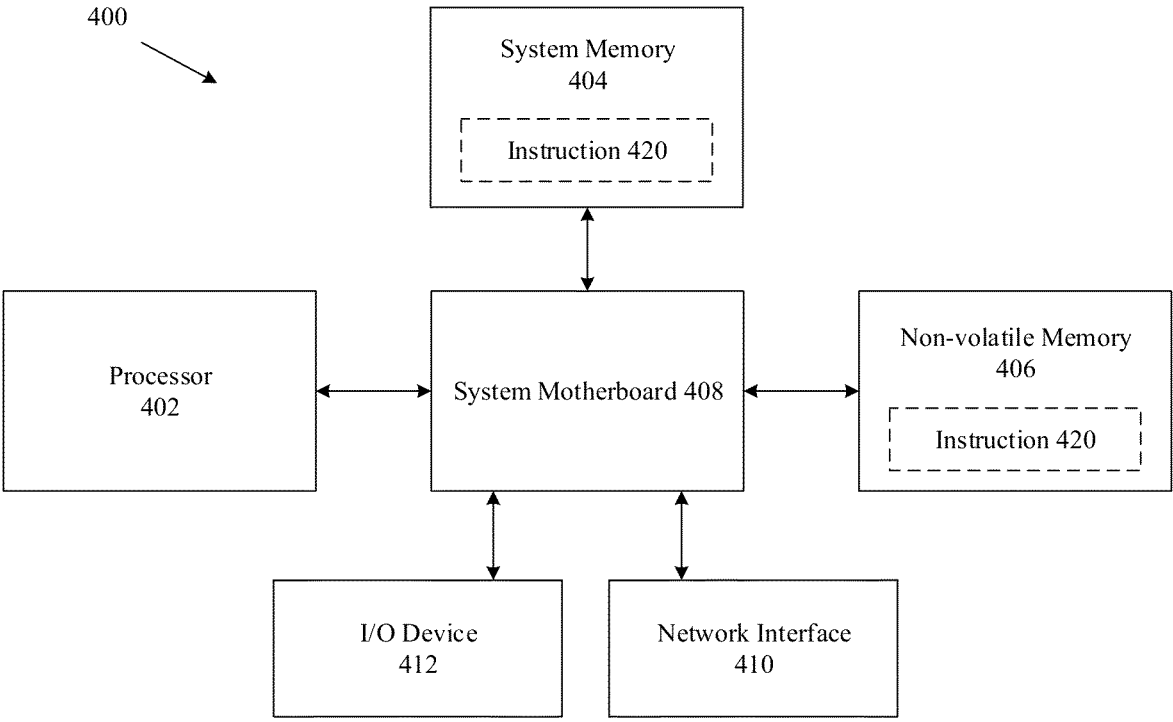
FIG. 5 is a block diagram showing a hardware structure of an electronic device implementing the method for virtual object interaction according to an embodiment of the present application.

FIG. 5 is a block diagram showing a hardware structure of an electronic device implementing the method for virtual object interaction according to an embodiment of the present application.

As shown in FIG. 5, an electronic device 400 may be a server 10, including one or more processors 402, a system motherboard 408 connected to at least one of the processors 402, a system memory 404 connected to the system motherboard 408, and a non-volatile memory (NVM) 406 connected to the system motherboard 408, and a network interface 410 connected to the system motherboard 408.

The processor 402 may include one or more single-core or multi-core processors. The processor 402 may include any combination of a general-purpose processor and special-purpose processors (e.g., a graphics processor, an application processor, a baseband processor, etc.). In the embodiments of the present application, the processor 402 may be configured to perform one or more embodiments shown in FIGS. 1 to 4.

In some embodiments, the system motherboard 408 may include any suitable interface controller to provide a suitable interface for at least one of the processors 402 and/or for any suitable device or component in communication with the system motherboard 408.

In some embodiments, the system motherboard 408 may include one or more memory controllers, thus providing an interface connected to the system memory 404. The system memory 404 may be used to load and store data and/or instructions. In some embodiments, the system memory 404 of the electronic device 400 may include any suitable volatile memory, such as suitable dynamic random-access memory (DRAM).

The NVM 406 may include one or more tangible, non-transitory computer-readable storage medium for storing data and/or instructions. In some embodiments, The NVM 406 may include at least one of any suitable non-volatile memory such as flash memory and/or any suitable non-volatile storage device, such as Hard Disk Drive (HDD), Compact Disc (CD) drive, Digital Versatile Disc (DVD) drive.

The NVM 406 may include part of storage resources installed on an apparatus of electronic device 400, or may be accessed by the device but not necessarily part of the device. For example, the NVM 406 may be accessed over the network via the network interface 410.

In particular, the system memory 404 and the NVM 406 may include temporary and permanent copies of instructions 420, respectively. The instructions 420 may include instructions that, when executed by at least one of the processors 402, cause the electronic device 400 to implement the methods shown in FIGS. 1 to 4. In some embodiments, the instructions 420, hardware, firmware, and/or software components thereof may additionally/alternatively be in the system motherboard 408, the network interface 410, and/or the processor 402.

The network interface 410 may include a transceiver for providing a radio interface for the electronic device 400 to communicate with any other suitable device (e.g., a front-end module, an antenna, etc.) over one or more networks. In some embodiments, the network interface 410 may be integrated in other components of the electronic device 400. For example, the network interface 410 may be integrated in at least one of the processor 402, the system memory 404, the NVM 406, and a firmware device (not shown) having instructions that, when executed by at least one of the processors 402, the electronic device 400 implements one or more embodiments shown in FIGS. 1 to 4.

The network interface 410 may further include any suitable hardware and/or firmware to provide a multiple-input multiple-output radio interface. For example, the network interface 410 may be a network adapter, a wireless network adapter, a telephone modem, and/or a wireless modem.

In an embodiment, at least one of the processors 402 may be packaged with one or more controllers for the system board 408 to form a system in package (SiP). In an embodiment, at least one of the processors 402, together with one or more controllers for the system board 408, may be integrated on the same chip to form a system on a chip (SoC).

The electronic device 400 may further include an input/output (I/O) device 412 connected to the system motherboard 408. The I/O device 412 may include a user interface that enables a user to interact with the electronic device 400. Interfaces for peripheral components are further designed to enable the peripheral components to interact with the electronic device 400. In some embodiments, the electronic device 400 further includes a sensor for determining at least one of environmental conditions and location information related to the electronic device 400.

In some embodiments, the I/O device 412 may include, but is not limited to, a display (e.g., a liquid crystal display, a touch screen display, etc.), a speaker, a microphone, one or more cameras (e.g., a still-image camera and/or video camera), a flashlight (e.g., an LED flash) and a keyboard.

In some embodiments, the interfaces for peripheral components may include, but are not limited to, a non-volatile memory port, an audio jacks, and a power interface.

In some embodiments, sensors may include, but are not limited to, a gyroscope sensor, an accelerometer, a proximity sensor, an ambient light sensor, and a positioning unit. The positioning unit may also be part of the network interface 410 or may interact with the network interface 410 to communicate with components of the positioning network (e.g., Global Positioning System (GPS) satellites).

It may be understood that the structure illustrated in the embodiments of the present application does not constitute a specific limitation on the electronic device 400. In other embodiments of the present application, the electronic device 400 may include more or less components than those shown in the figures, or some combined components, some detached components, or arrangements of different components. The illustrated components may be implemented in hardware, software, or a combination of software and hardware.

Program codes may be applied to input instructions, to perform the functions described herein and generate output information. Output information may be applied to one or more output devices in a known manner. For realizing the purpose of this application, a system including the processor 402 for processing instructions includes any system having a processor such as a digital signal processor (DSP), a microcontroller, an application specific integrated circuit (ASIC), or a microprocessor.

The program codes may be implemented in a high-level procedural language or an object-oriented programming language, to communicate with the processing system. When necessary, an assembly language or a machine language may also be used to implement the program codes. In fact, the mechanisms described in this application are not limited to the scope of any particular programming language. In either case, the language may be a compiled or interpreted language.

One or more aspects of at least one embodiment may be implemented by instructions stored in a computer-readable storage medium, which when read and executed by the processor, enable the electronic device to implement the methods of the embodiments described in the application.

According to some embodiments of the present application, a computer storage medium is disclosed. Instructions are stored in the computer storage medium. The instructions, when being run on a computer, cause the computer to execute the method for virtual object interaction according to the embodiments of the present application.

The method embodiments of the present application correspond to this embodiment, and this embodiment may be implemented in cooperation with the method embodiments of the present application. The relevant technical details mentioned in the method embodiments of this application are still valid in this embodiment, and will not be described herein again to reduce duplication. Correspondingly, the relevant technical details mentioned in this embodiment may also be applied to the method embodiments of this application.

According to some embodiments of the present application, a computer program product is disclosed, and includes computer-executable instructions that, when executed by a processor, cause the processor to implement a method for virtual object interaction according to embodiments of the present application.

The method embodiments of the present application correspond to this embodiment, and this embodiment can be implemented in cooperation with the method embodiments of the present application. The relevant technical details mentioned in the method embodiments of this application are still valid in this embodiment, and will not be described again in order to reduce duplication. Correspondingly, the relevant technical details mentioned in this embodiment can also be applied to the method embodiments of this application.

It may be understood that the specific embodiments described herein are only for explaining the present application, but not for limiting the present application. In addition, for convenience of description, only some but not all structures or processes related to the present application are shown in the drawings. It should be noted that in this specification, similar reference numerals and letters represent similar items in the drawings.

It should be understood that, although the terms "first" and "second", etc., may be used herein to describe various features, these features should not be limited by these terms. These terms are used solely for purposes of distinction but not to be construed as indicating or implying relative importance. For example, a first feature could be named as a second feature, and similarly, a second feature could be named as a first feature without departing from the scope of exemplary embodiments.

In the description of this application, it should also be noted that, unless otherwise clearly stated and limited, the terms "arranged", "connected" and "attached" should be understood in a broad sense. For example, it may be a fixed connection, a detachable connection, or an integral connection; it may be a mechanical connection or an electrical connection; it may be a direct connection, or an indirect connection through an intermediate medium, or an internal connection between two components. For those of ordinary skill in the art, the specific meanings of the above terms in the embodiments should be understood based on specific situations.

Illustrative embodiments of the present application include, but are not limited to, the method for virtual object interaction, the device, the storage medium, and the computer program products.

The illustrative embodiments are described by using terminologies commonly adopted by those skilled in the art in order to convey the substance of the embodiments to others skilled in the art. However, it will be apparent to those skilled in the art that alternative embodiments may be implemented by using some of the described features. For purposes of explanation, specific numbers and configurations are set forth to provide a thorough understanding of the illustrative embodiments. However, it will be apparent to those skilled in the art that the alternative embodiments may be implemented without the specific details. In some other instances, well-known features are omitted or simplified herein to avoid indefinite illustrative embodiments of the present application.

Furthermore, various operations will be described as multiple discrete operations in a manner that is most helpful in understanding the illustrative embodiments; however, the described order should not be construed to imply that these operations are necessarily dependent on the described order, and many of these operations may be performed in parallel, concurrently, or simultaneously. Additionally, the order of the operations may be rearranged. The process may be terminated when the described operations are completed, but may also include additional steps not included in the figures. The process may correspond to a method, a function, a procedure, a subroutine, or a subprogram, etc.

References of "an embodiment", "embodiments", and "an exemplary embodiment", etc., in the specification mean that the described embodiment may include a particular feature, structure, or property, but that each embodiment may or need not include a specific feature, structure, or property. Furthermore, these phrases are not necessarily referring to the same embodiment. Furthermore, when particular features are described with reference to specific embodiments, the knowledge of those skilled in the art can influence the combination of these features with other embodiments, whether these embodiments are explicitly described or not.

The terms "include", "have", and "contain" are synonyms unless the context dictates otherwise. The phrase "A and/or B" means "(A), (B) or (A and B)".

As used herein, the term "module" may refer to, be a part of, or include: a memory (shared, dedicated, or grouped), an application specific integrated circuit (ASIC), an electronic circuit and/or a processor (shared, dedicated, or grouped), a combinational logic circuit which are used for running one or more software or firmware programs, and/or other suitable components that provide the functionality described.

In the drawings, some structural or methodological features may be shown in a specific arrangement and/or order. However, it should be understood that such a specific arrangement and/or order is unnecessary. However, in some embodiments, these features may be illustrated in a manner and/or order different than that shown in the illustrative figures. In addition, a structural or methodological feature shown in a particular figure do not mean that all embodiments need to include such a feature. In some embodiments, the feature may not be included or may be combined with other features.

In some cases, the disclosed embodiments may be implemented in form of hardware, firmware, software, or any combination thereof. The disclosed embodiments may also be implemented in the form of instructions or programs, which are carried or stored on one or more transient or non-transitory machine-readable (e.g., computer-readable) storage medium, and which may be read and executed by one or more processor etc. When instructions or programs are run by a machine, the machine may perform the methods described above. For example, instructions may be distributed over a network or other computer-readable storage medium. Thus, a machine-readable medium may include, but is not limited to, any mechanism for storing or transmitting information in a form readable by a machine (e.g., a computer), such as a floppy disk, an optical disk, a compact disk-read-only memory (CD-ROM), a magnetic Optical disc, a read-only memory (ROM), a random-access memory (RAM), an erasable programmable read-only memory (EPROM), an electronically erasable programmable read-only memory (EEPROM), a magnetic or optical card, or a flash memory or tangible machine-readable storage which transmits network information through electrical, optical, acoustic, or other forms of signals (e.g., carrier waves, infrared signals, digital signals, etc.). Thus, machine-readable storage medium includes any machine-readable storage medium suitable for storage or transmission of electronic instructions or machine (e.g., computer)-readable information.

The embodiments of the present application are described in detail above with reference to the accompanying drawings. However, the technical solutions of the present application are not limited to various applications mentioned in the embodiments of the present application. Various structures and modifications may be easily made with reference to the technical solutions of the present application to achieve various beneficial effects described in the present disclosure. Various changes made within the scope of knowledge possessed by those of ordinary skill in the art without departing from the purpose of this application shall fall within the scope of the present application.

What is claimed is:

1. A method for virtual object interaction, comprising:

receiving, by a server, an interaction instruction from a client to instruct multiple first virtual objects to interact with a target virtual object;

creating, by the server, one or more mirror objects of the target virtual object, a sum of the number of the one or more mirror objects and the number of the target virtual object being the same as the number of the multiple first virtual objects;

calculating, by the server, interaction data of interactions between the multiple first virtual objects, and the target virtual object and the one or more mirror objects, wherein each of the multiple first virtual objects interact with the target virtual object and the one or more mirror objects in a one-to-one correspondence, and interaction processes are independent of each other; and synchronizing, by the server, first attribute data of the target virtual object and first attribute data of the one or more mirror objects based on the interaction data, and sending the synchronized first attribute data to the client.

2. The method according to claim 1, wherein the first attribute data comprise the number of hit points.

3. The method according to claim 1, wherein the interaction data further comprise second attribute data that are only visible to the multiple first virtual objects and to the target virtual object or the one or more mirror objects corresponding to each of the interaction processes; and the second attribute data comprise a remaining skill cool down time, hit points restored during the interaction processes, a buff status and a debuff status.

4. The method according to claim 3, wherein the second attribute data further comprise a debuff status caused by one of the multiple first virtual objects of a predetermined type, and the debuff status is configured to act on the target virtual object and all of the one or more mirror objects, respectively.

5. The method according to claim 1, wherein, calculating, by the server, the interaction data of the interactions between the multiple first virtual objects, and the target virtual object and the one or more mirror objects comprises:

the server determining that, among the multiple first virtual objects, one first virtual object starting to participate in an interaction first is a main target object, and other first virtual objects are non-main target objects, wherein calculation rules of interaction data of the non-main target objects are different from calculation rules of interaction data of the main target object.

6. The method according to claim 5, further comprising:

under a condition that the main target object exits the interaction, the server determining that, among the non-main target objects, one non-main target object starting to participate in an interaction first is a new main target object.

7. The method according to claim 1, wherein the multiple first virtual objects and the target virtual object each comprise one or more virtual object units of the same type.

8. The method according to claim 1, wherein the interaction data comprise created, transmitted, used, or modified data involved in each of the interaction processes.

9. The method according to claim 1, wherein an attribute of each of the one or more mirror objects is the same as an attribute of the target virtual object, or is a proportion of the attribute of the target virtual object.

10. The method according to claim 1, further comprising showing the interactions between the multiple first virtual objects and the target virtual object on the client.

11. The method according to claim 2, wherein:

during the interaction processes and in a current frame, the number of hit points of only one of the target virtual object and the one or more mirror objects is changed;

synchronizing, by the server, the first attribute data of the target virtual object and the first attribute data of the one or more mirror objects based on the interaction data comprises:

summing cumulatively, by the sever, change values of the number of the hit points of the only one of the target virtual object and the one or more mirror objects to obtain a cumulative change value of the number of the hit points;

subtracting, by the sever, the cumulative change value of the number of the hit points from an original number of the hit points of the only one of the target virtual object and the one or more mirror objects in the current frame, to obtain an updated number of the hit points of the only one of the target virtual object and the one or more mirror objects; and changing, by the server, each of hit point numbers of other of the target virtual object and the one or more mirror objects in a next frame to be the updated number of the hit points synchronously.

12. The method according to claim 2, wherein:

during the interaction processes and in a current frame, hit point numbers of two or more of the target virtual object and the one or more mirror objects are changed;

synchronizing, by the server, the first attribute data of the target virtual object and the first attribute data of the one or more mirror objects based on the interaction data comprises:

calculating, by the server, a total change value of the hit point numbers of the two or more of the target virtual object and the one or more mirror objects in the current frame;

subtracting, by the server, the total change value of the hit point numbers from an original number of hit points of any one of the target virtual object and the one or more mirror objects in the current frame, to obtain an updated number of each of hit point numbers of the target virtual object and the one or more mirror objects in a next frame.

13. An electronic device, wherein the electronic device is the server and comprises a memory having computer-executable instructions stored thereon and a processor; and the computer-executable instructions, when executed by the processor, cause the server to perform the method for virtual object interaction according to claim 1.

14. A non-transitory computer storage medium, having instructions stored thereon, wherein, the instructions, when running on a computer, cause a computer to perform the method for virtual object interaction according to claim 1.

15. A computer program product, comprising computer-executable instructions, wherein the computer-executable instructions, when executed by a processor, perform the method for virtual object interaction according to claim 1.

* * * * *